United States Patent [19]

Gruenwald

[11] 4,385,253

[45] May 24, 1983

[54] COMMUTATOR CONE

[75] Inventor: Geza Gruenwald, Erie, Pa.

[73] Assignee: General Electric Company, Erie, Pa.

[21] Appl. No.: 295,162

[22] Filed: Aug. 21, 1981

[51] Int. Cl.[3] .................. H01R 39/04; H02K 13/04

[52] U.S. Cl. .................. 310/236; 310/43; 310/45; 310/235; 310/237; 428/251; 428/252

[58] Field of Search .................. 310/236, 235, 237, 43, 310/45; 428/251, 252

[56] References Cited

U.S. PATENT DOCUMENTS

| | | | |
|---|---|---|---|
| 1,872,269 | 8/1932 | Frederick | 310/236 |
| 2,528,235 | 10/1950 | Loritsch | 310/236 |
| 2,880,336 | 3/1959 | Wohlferth et al. | 310/236 |
| 3,500,094 | 3/1970 | Gilbert | 310/236 |
| 3,764,449 | 10/1973 | Copeland et al. | 428/251 |
| 4,126,719 | 11/1978 | Koyanagi et al. | 428/251 |
| 4,214,026 | 7/1980 | Ibata et al. | 428/251 |
| 4,255,483 | 3/1981 | Byrd et al. | 428/251 |

FOREIGN PATENT DOCUMENTS

| | | | |
|---|---|---|---|
| 952923 | 3/1964 | United Kingdom | 310/236 |

*Primary Examiner*—William R. Dixon, Jr.
*Attorney, Agent, or Firm*—Albert S. Richardson, Jr.

[57] ABSTRACT

A non-micaceous commutator cone for insulating commutator bars from retaining rings of a commutator assembly in a dynamoelectric machine, comprising an annular laminated member including at least one layer of non-conductive, resin-impregnated fibrous elements sandwiched between outer layers of thin, seamless, impervious, non-thermoplastic polymeric films. The wall of this laminate has the dielectric strength, the uniform thickness, the stability, and the resiliency that are required for a commutator cone in a relatively large, high temperature machine.

9 Claims, 4 Drawing Figures

COMMUTATOR CONE

BACKGROUND OF THE INVENTION

This invention relates to means for insulating commutator bars from their retaining rings in a commutator assembly of a dynamoelectric machine, and it relates more particularly to non-micaceous laminated commutator cones.

A typical commutator assembly such as a V-ring type commutator assembly comprises a plurality of electrically conductive commutator bars or segments which are mounted in a cylindrical array at one end of the rotatable shaft of a direct current (d-c) motor or generator for cooperation with relatively stationary carbon brushes. Adjacent bars are separated by insulating material. All of the bars are adapted to be held in their assembled relationship by a pair of metallic retaining rings having annular flanges adapted to extend into V-shaped notches formed in opposite ends of the commutator bars. A first one of the retaining rings, which are typically made of steel and in operation are at ground potential, is affixed to the machine's shaft, and the other ring is clamped to the first one by bolts or by other suitable means with the cummutator bars captured therebetween. The retaining rings are insulated from the commutator bars by suitable annular insulating members, generally known as commutator cones, which are disposed at opposite ends of the commutator assembly between the commutator bars and the retaining rings.

In operation the commutator cones must have good dielectric strength and good physical strength and stablility, since the commutator bars and the adjacent retaining ring between which each cone is located will subject it to a high steady-state electrical potential (e.g., 1,000 volts rms) and a high maximum mechanical compressive force (e.g., 6,000 psi). A typical commutator cone comprises an annular outer skirt integrally joined to a conical section so that the juncture thereof has a substantially V-shaped cross-section. The conical section is the part of the cone that is subjected to the most severe electrical and mechanical stresses.

Heretofore larger size cones have been manufactured to the desired V-ring contour by pressing and heating stacked layers or sheets of micaceous material in a suitably shaped mold. Prior to this process, individual pieces or flakes of mica are premolded into a plurality of flat segments of various predetermined shapes and sizes. To form the commutator cone, a first set of segments, along with a suitable binder (such as shellac or a synthetic resin varnish) which holds the segments together in a desired pattern, are arranged in an abutting manner to form a first generally ring-shaped lever, other sets of the segments are similarly arranged to form additional laminae on top of the first one (with the inter-segment joints or seams in each lamina being offset or staggered with respect to those in the preceding laminae), and then the stacked laminae are bonded together in the mold under pressure and heat. For a 12-inch diameter cone, these prior art premolding and final molding processes require about four to five hours.

Suitable large flake mica has become increasingly more difficult to obtain and more expensive. Mica flakes, as noted above, are premolded into segments of larger size, and consequently the mica segments have irregular surfaces. For this reason, and because of occassional resin "pockets" in the mica segments, the walls of the conical sections of micaceous cones are not as uniformly thick as is desired and some portions thereof may have light spots. The light spots may have insufficient dielectric strength to withstand the electrical stress to which the cones are subjected. Non-uniformity can result in out-of-round cones and "high spots" on the commutator (i.e., some of the commutator bars may protrude beyond a true cylindrical envelope), and this condition causes undesirably fast commutator brush wear. Furthermore, at those points between the retaining rings and the commutator bars where the cone wall is thickest, commonly referred to as the pressure points, the pressure against the cone is highest, thereby abrading the mica flakes and degrading their insulating property.

With micaceous cones and with micaceous insulation between adjacent commutator bars, the commutator has to be "seasoned" by repeated baking and tightening cycles, with the temperature and pressure being incrementally increased from cycle to cycle, whereby the manufacturing process consumes undesirable amounts of time and energy. In addition, due to differences in the coefficients of thermal expansion of copper, steel and the commutator cone, movements will occur when the temperature rises and falls during machine operation. Such relative movements can lead to the grinding destruction of the brittle mica flakes in the prior art cones.

In order to improve the uniformity of the physical and electrical properties of a micaceous commutator cone and to avoid pressure points and so-called resin pockets, P. R. Gilbert has suggested, in his U.S. Pat. No. 3,500,094, that a lamina of uncalendered polyamide fiber paper be disposed between exterior layers of mica. Prior to final curing, the interior lamina is more compressible than mica and therefore tends to cushion and compensate for thickness variations in the micaceous layers.

In another prior art commutator cone of which I am aware, the segments or sheets of mica are replaced altogether with paper-like sheets of small aramide fibers, bonded together with polyimide varnish. The resulting cone is referred to as a Nomex V-ring. The raw material can be purchased in uniformly thick sheets that can be cut into segments having the various predetermind shapes that are desired for molding purposes, thereby eliminating the cost of premolding mica flakes into larger segments and avoiding the irregular surfaces and the light spots of such premolded micaceous segments. However, the wall of a Nomex V-ring has seams due to the piecing together of a plurality of individual segments of aramid sheets, and it is nearly as thick as the wall of a micaceous cone. Furthermore, the mechanical and electric-insulating properties of a Nomex V-ring tend to degrade when the V-ring has aged at elevated temperatures.

In his U.S. Pat. No. 2,528,235, J. A. Loritsch has disclosed a non-micaceous commutator cone comprising laminated sheets of glass-fiber cloth bonded together with a polyvinyl acetal resin-modified copolymer of a polymerizable unsaturated alkyd resin and a polyallyl ester. The dielectric strength of this composite material at high temperatures is undesirably low.

An insulating material that is advantageous in a high-temperature environment is known generically as polyimide film, and it is manufactured and sold by the DuPont Company under the trademark "Kapton." An FEP-fluorocarbon resin coated form of such film is made by the DuPont Company. This material will remain physically and electrically stable at higher temperatures and has a higher dielectric strength than Nomex. However, it is not readily formable into a body having the mechanical strength, stiffness, and shape of a commutator cone.

SUMMARY OF THE INVENTION

One objective of the present invention is to provide an improved non-micaceous commutator cone and thereby avoid the disadvantages of using mica in the manufacture of commutator cones.

Another object of this invention is to provide a non-micaceous commutator cone that can be constructed with a thinner wall than prior art cones while still having the required electrical insulating quality and the necessary mechanical strength and stability at relatively high temperatures.

Yet another object is to provide, for relatively large diameter commutator assemblies, practical commutator cones made with polyimide film or its equivalent.

In carrying out the invention in one form, a commutator cone is formed by laminating at least one inner layer of non-conductive fibrous elements (such as glass fibers) impregnated with a thermally cured resin (such as a polyester) between outer layers of dielectric, non-micaceous, non-fibrous impervious material adherent to the cured resin. Each of the outer layers is formed by a single, very thin, relatively large-area, seamless non-thermoplastic polymeric film (such as a polyimide film), whereby these layers provide the cone with the desired dielectric strength at high temperatures. The inner layer, prior to curing, is moldable and is more yielding than the outer layers, but once cured it is mechanically stronger. Consequently the inner layer reinforces the laminated cone while accomodating any wrinkles or folds in the outer film layers so that the wall of the critical conical section of the cone has a substantially uniform thickness and perfectly smooth exterior surfaces. The resulting cone, compared to the prior art micaceous cone, can have a thinner wall, is less expensive to manufacture, and requires less retightening of the commutator assembly during the seasoning process. The laminated cone of this invention is more stable thermally than the prior art Nomex V-ring.

The invention will be better understood and its various objects and advantages will be more fully appreciated from the following description taken in conjunction with the accompanying drawings.

DETAILED DESCRIPTION

Figure 1:
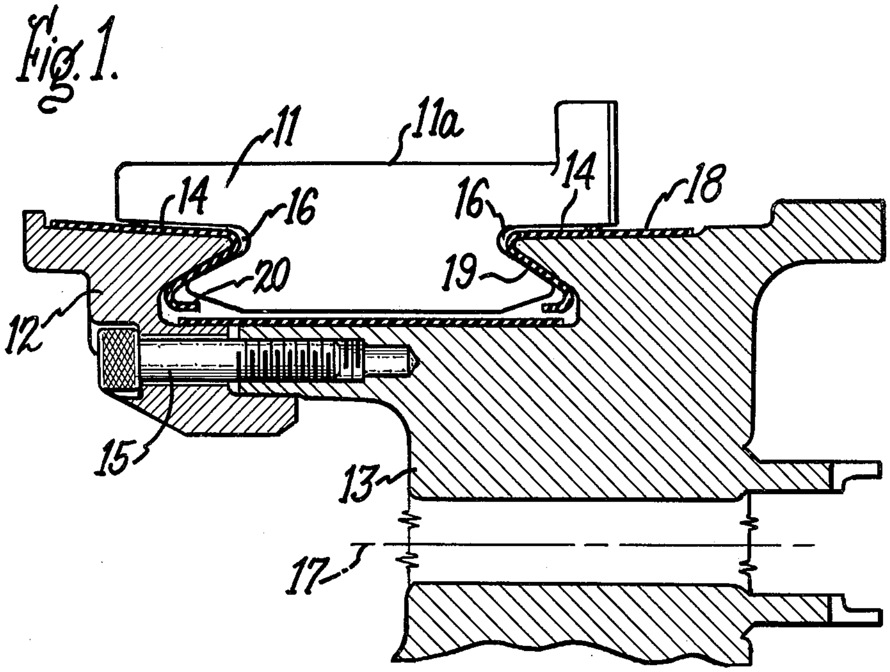
FIG. 1 is a cross-sectional view of a commutator assembly including a pair of arch-bound commutator cones constructed in accordance with this invention.

Illustrated in FIG. 1 is a section of a typical V-ring, arch-bound type commutator assembly comprising a plurality of commutator bars 11 of copper, cooperating retaining rings 12 and 13 of steel, a spaced pair of commutator cones 14 of insulating material, and a bolt 15. The bolt 15 clamps the outer retaining ring 12 to the companion ring 13, thereby holding the commutator bars on a rotating shaft to which the ring 3 is attached. The retaining rings have angular flanges which extend into V-shaped notches 16 formed in each end of each of the commutator bars 11 (only one bar is shown in the FIG. 1 cross sectional view).

Each commutator bar 11 is an electrically conductive, current-carrying element or segment whose face 11*a* is adapted to be slidingly contacted by a carbon brush (not shown) as the assembly rotates about the centerline 17 of the shaft. It is insulated from the metallic retaining rings 12 and 13 by the commutator cones 14. The cones 14 fit between the V notches 16 of the commutator bars and the flanged portions of the rings 12 and 13, respectively.

Figure 2:
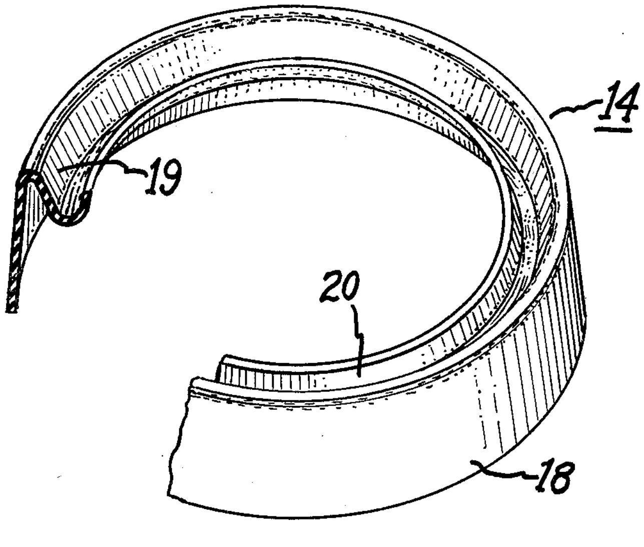
FIG. 2 is a fragmentary perspective view of one of the commutator cones.

Each commutator cone 14, as is best seen in FIG. 2, is an annular member of dielectric material having a generally cylindrical outer skirt 18 and an integral part which includes a conical section 19 and an inner section 20 of U-shaped cross-section. Thus the overall cross section of this member is generally S-shaped. The juncture of the skirt 18 and the conical section 19 of the cone 14 is shaped to fit between one of the notched ends of the commutator bars 11 and the cooperating flange of the adjacent retaining ring 12 or 13. In an arch-bound commutator, only the conical section 19 of the cone is in compression when the commutator is fully assembled and in operation.

Figure 3:
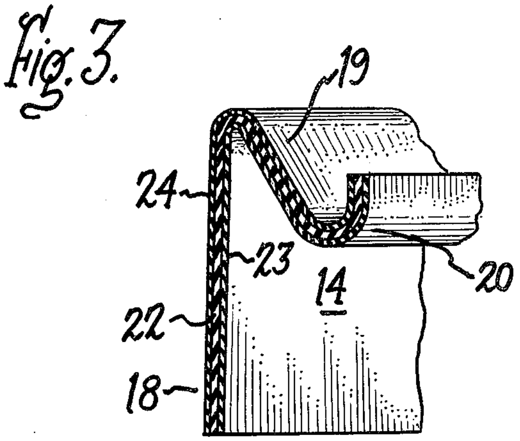
FIG. 3 is an enlarged cross-sectional view of the commutator cone shown in FIG. 2.

As is shown more clearly in FIG. 3, the cone 14 is a laminate having several discrete layers. As a minimum, there is one internal layer 22 sandwiched between and bonded to two outer layers 23 and 24. The internal layer 22 comprises non-conductive fibrous elements impregnated with a thermally cured resin. The two outer layers 23 and 24 are made of dielectric, non-micaceous, non-fibrous impervious seamless material which adheres to the cured resin of the inner layer 22. This dielectric material consists of a thin non-thermoplastic polymeric film having a relatively high dielectric strength at elevated temperatures (such as a polyimide film). Preferably the inside surfaces of the outer layers 23 and 24, respectively, are coatd with a silicone resin to enhance the bond between these layers and the internal layer 22.

The fibrous elements of the internal layer 22 provide the stiffness, shape, and mechanical integrity that are required of a commutator cone. A glass fiber mat is well suited for this purpose. The thermosetting resin which impregnates the fibrous elements must exhibit adhesive characteristics at high temperature (200° C. or higher) and adhere at such a temperature to both the fibrous elements of layer 22 and the outer layers 23 and 24 of polymeric film. Suitable resins include polyesters, polyvinyl resins, epoxy resins, alkyd resins, and blends or combinations thereof well known to persons skilled in the art. To improve the chemical binding of the resin and the fibrous elements, the latter can be treated with silane.

Prior to final curing, the internal layer 22 of resin-impregnated fibrous elements is relatively pliable, and during the molding process it is stretched or compacted as necessary to conform to the shape of the mold cavity and to accommodate for wrinkles or creases in the outer layers 23 and 24 of seamless, non-thermoplastic intractable polymeric film. As a result, the wall of the conical section 19 of the finished cone has a very uniform thickness and its exterior surfaces are as smooth as the walls of the mold cavity. After curing, the internal layer 22 exhibits sufficient resiliency to withstand the compressive stresses applied during assembly of the commutator and the shear stresses caused by the differences in thermal expansion of the steel retaining rings 12, 13 and the copper commutator bars 11 when the commutator is operating at high temperatures.

The actual number of internal layers 22 and the thickness of each such layer will depend on the desired thickness of the wall of the laminated commutator cone 14. For higher dielectric strength, at least one additional layer of non-thermoplastic polymeric film can be disposed between the outer layers 23 and 24. In one practical embodiment that will soon be described with reference to FIG. 4, the cone has two inner layers of fibrous elements separated by a middle layer of polymeric film.

In accordance with the present invention, each of the outer layers 23 and 24 of non-thermoplastic polymeric film (and any inner layer of the same material) is made from a single, large-area, generally symmetrical seamless sheet of such film. For example, for a commutator cone having a diameter of seven inches, the sheet (before molding) is disc-shaped and has an average diameter of approximately 14 inches. Preferably the perimeter of the sheet is polygonal (e.g., octagonal) rather than circular. When such a sheet is placed in a mold and thereby forced to conform to the shape of the above-described commutator cone, it has excess area in the cylindrical sections of the cone, especially around the outer skirt 18, and this excess area forms a plurality of overlapping folds in such sections. Because the polymeric film is non-thermoplastic and intractable these folds do not fuse or merge together when the cone is heated under pressure during the molding process. Nevertheless, the wall thickness of the finished cone is very uniform because during the molding process the partially-cured internal layers of resin-impregnated fibrous elements are pliable and will extend and stretch as necessary to produce such uniformity. After the cone is molded and cured, its central area is cut out, thereby removing the unwanted material that was encompassed by the inner section 20 of the cone, and the excess material extending beyond the perimeter of the skirt 18 is trimmed.

It is also advantageous to make each internal layer 22 from a large-area, seamless piece of resin-impregnated fibrous elements. The original fibrous piece preferably has the same size as the disc-shaped sheet of polymeric film, whereby after molding it will be coextensive with the skirt 18 and both the conical and inner sections 19 and 20 of the cone 14. During the molding process, this fibrous piece stretches and/or compacts without tearing or wrinkling in order to conform to the shape of the commutator cone. Nevertheless, around its periphery there is an excess of fibrous material that forms a plurality of overlapping folds in the region of the cone's skirt 18. Such folds integrally bond to one another under the pressure and heat of the molding process. As a result, the internal layer 22 tends to be extra thick in the vicinity of the skirt 18. To ensure a uniformly thick wall throughout the cone, an extra piece of resin-impregnated fibrous elements is placed next to the first-mentioned fibrous piece in the mold. The extra piece is a circular disc of relatively small diameter so that when molded it does not reach the outer skirt 18, and it ensures that the internal layer 22 is as thick in the conical and inner sections 19 and 20 of the cone as in the skirt 18.

Before describing a practical process for molding and curing a preferred embodiment of the laminated commutator cone 14, some of the advantageous features of the cone will be briefly reviewed. The cone uses no mica. Each of its composite layers is made from seamless sheets or large-area pieces of dielectric material, thereby avoiding the time and labor of fitting together a plurality of smaller segments and eliminating the resulting joints between segments. The wall of the cone has a substantially uniform thickness and is especially smooth and wrinkle-free in the critical conical section 19. This reduces the number of pressure points in the conical section and increases the stability of the cone. Such increased stability results in the cone of the present invention being better suited for larger, higher speed motors and generators than prior art micaceous commutator cones. The internal layer(s) of fibrous elements provides a desired degree of resilience to the finished cone. A typical 12-inch diameter cone made from mica has a wall thickness of approximately 62 mils; a 12-inch cone having the new construction disclosed and claimed in this application, with polyimide film used to form its outer layers, can provide the same or better mechanical and electrical properties with a much thinner wall (e.g. 30 to 40 mils).

In the presently preferred embodiment of the invention, there are two internal layers of resin-impregnated fibrous elements. Each of these layers comprises commercially available ounce-and-a-half glass mat treated with a silane and impregnated with an equal amount (by weight) of partially cured, thermally curable high-temperature polyester resin. In practice, General Electric type IMD 18149 B-71 resin was used, and it was applied by spreading it over the glass mats and drying it before the mats were placed in the commutator cone mold. For better impregnation, this resin was first diluted to reduce its solids content to about 30 to 35 percent by adding a mixture of totuol and alcohol (60:40). For each of the two outer layers and the middle layer of impervious, non-thermoplastic polymeric film, 2-mil Kapton insulation having an FEP-fluorocarbon resin coating is preferably used. Kapton comprises a thin gauge polyimide film, and its FEP-fluorocarbon resin coating provides a heat-sealable surface. This material is manufactured and sold by the DuPont Company. Prior to loading the mold with the Kapton film that will form each of the outer layers of the cone, the inside surface of the film is thinly coated (by brushing or spraying) with a silicone resin adhesive which will improve the bond between the outer layer and the contiguous internal layer of fibrous elements. In practice, General Electric type SR529 silicone resin mixed with an equal part of toluol was used, with one percent benzoyl peroxide added to this solution to serve as a catalyst which enhances the adhesive properties of the silicone resin by accelerating its chemical cross-linking.

Figure 4:
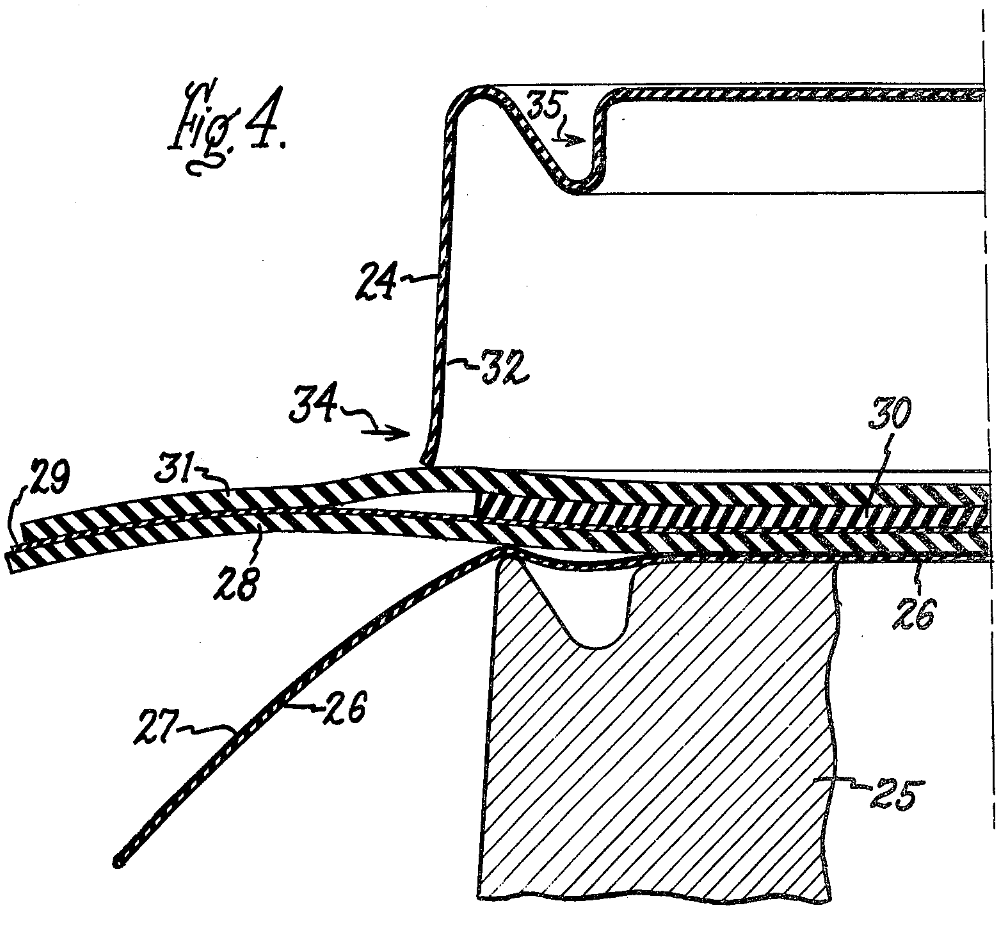
FIG. 4 is a fragmentary cross-sectional view of the several layers of the commutator cone prior to being molded into the desired shape.

FIG. 4 illustrates the presently preferred process for molding the above-described commutator cone 14. Only the male member 25 of the mold is shown, and the thicknesses of the respective laminae are exaggerated. Best results have been obtained by "preforming" the top one (24) of the outer layers of the cone. This can conveniently be done by placing a single, large-area, symmetrical sheet (preferably having an octagonal shape) of 2-mil Kapton film in the preheated commutator cone mold on top of a finished cone, closing the mold and applying pressure for only a few seconds, and then removing the preformed layer. (If desired, a plurality of top layers for a corresponding plurality of cones can be simultaneously preformed in the mold, in which case a finished cone is not used during this preforming step.) Thereafter, a coating of silicone resin is applied to the inside or concave surface of the preformed top layer 24. The skirt of this layer is not trimmed and the central area is not cut out at this stage of the process.

As is indicated in FIG. 4, the following pieces or sheets or material are stacked concentrically on the male member 25 of the mold: a single, large-area) symmetrical (preferably octagonal) sheet 26 of 2-mil Kapton film which has a coating 27 of silicone resin on its upper surface; a first large-area, symmetrical (octagonal), flat piece 28 of resin-impregnated glass mat; another sheet 29 of 2-mil Kapton film having the same shape and size as the sheet 26; a relatively small diameter circular disc 30 of resin-impregnated glass mat; another piece 31 of the same material which has the same shape and size as the first piece 28; and the preformed top layer 24 whose concave side has been given a coating 32 of silicone resin. Note that glass cloth can be used in lieu of glass mat for the pieces 28, 30, and 31, in which case successive pieces should be rotated so that their fiber orientations do not parallel one another. After the above-described stack of laminae is placed on the male member of the preheated mold, the female member (not shown) is mated with the preformed top layer 24 and slowly closed on top of the stack. This forces the laminae into the desired shape. The disc-like fibrous piece 30 is too small to reach the cone's skirt, but its diameter is large enough so that this piece will be contiguous with the portion of the adjoining large-area fibrous piece 31 in the conical section of the cone, thereby adding thickness to the conical and inner sections of the internal layers and thus compensating for the thicker, peripheral folds of material in the skirt.

The composite material is cured in the mold under pressure (approximately 9 tons) for up to about one hour at a temperature in the range of 135 to 155 degrees centigrade, and it is then cooled to approximately 80° C. before releasing pressure and removing the cured product from the mold. Thereafter, the skirt of the cone is trimmed by cutting off the edges of the laminae extending beyond its desired border (see arrow 34 in FIG. 4), and the central area is carefully cut out (at arrow 35) to remove the unwanted material above and inboard of the inner section 20 of the annular cone 14.

While the preferred embodiment of the invention has been shown and described by way of example, many modifications will undoubtedly occur to persons skilled in the art. The concluding claims are therefore intended to cover all such modifications as fall within the true spirit and scope of the invention.

I claim:

1. A commutator cone having an annular outer skirt and an integral conical section, said cone being a composite of bonded layers of dielectric materials including at least one internal layer of fibrous elements impregnated with a cured resin disposed between discrete outer layers of relatively thin, seamless, non-thermoplastic, non-fibrous polymeric material.

2. A commutator cone according to claim 1 wherein each of said outer layers comprises a seamless polyimide film.

3. A commutator cone according to claim 1 wherein each of said outer layers in the vicinity of at least said annular skirt comprises folds of a single, relatively large-area sheet of non-thermoplastic, non-fibrous polymeric material.

4. A commutator cone according to claim 3 wherein said internal layer, prior to the curing of said resin, was pliable so as to accommodate any outer-layer wrinkles caused by said folds of said sheet, whereby the wall of said cone has a substantially uniform thickness.

5. A commutator cone according to claim 1 or 2 wherein said internal layer comprises a resin-impregnated glass mat.

6. A commutator cone according to claim 1 wherein said internal layer comprises a seamless, relatively large-area piece of fibrous material coextensive with both said outer skirt and said conical section of said cone and a smaller piece of fibrous material next to the conical-section portion of said large-area piece.

7. A commutator cone according to claim 1 wherein there are two internal layers of fibrous elements impregnated with a cured resin.

8. A commutator cone according to claim 7, comprising an additional discrete layer of relatively thin, seamless, non-thermoplastic, non-fibrous polymeric material disposed between said two internal layers.

9. A commutator cone according to claim 1, comprising a coating of silicone resin on the inside surface of each of said outer layers.

* * * * *